United States Patent
Renduchintala et al.

(10) Patent No.: US 12,361,714 B2
(45) Date of Patent: Jul. 15, 2025

(54) PROXIMITY DANGER DETECTION BASED ON SUBJECT AND OBJECT DISTANCE ANALYSIS

(71) Applicant: INTERNATIONAL BUSINESS MACHINES CORPORATION, Armonk, NY (US)

(72) Inventors: Nageswara Sastry Renduchintala, Kolkata (IN); Hamid Majdabadi, Ottawa (CA); Su Liu, Austin, TX (US); Yang Liang, BeiJing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 17/818,706

(22) Filed: Aug. 9, 2022

(65) Prior Publication Data
US 2024/0054788 A1 Feb. 15, 2024

(51) Int. Cl.
*G06V 20/52* (2022.01)
*G06T 7/70* (2017.01)
(Continued)

(52) U.S. Cl.
CPC .............. *G06V 20/52* (2022.01); *G06T 7/70* (2017.01); *G06V 20/41* (2022.01); *G08B 21/02* (2013.01);
(Continued)

(58) Field of Classification Search
CPC ...... G06V 20/52; G06V 20/41; G06V 10/774; G06V 20/46; G06V 40/103; G06V 10/76;
(Continued)

(56) References Cited

U.S. PATENT DOCUMENTS 9,576,460 B2    2/2017  Dayal
10,911,775 B1*  2/2021  Zhu .................. H04N 19/46
(Continued)

FOREIGN PATENT DOCUMENTS

EP    3657373    A1    5/2020
KR    102277967  B1    7/2021
WO    2008041143 A1    4/2008

OTHER PUBLICATIONS

Abuduweili, et al., "Adaptable Human Intention and Trajectory Prediction for Human-Robot Collaboration", ARXIV, Sep. 11, 2019, 5 pages. arXiv:1909.05089v.
(Continued)

*Primary Examiner* — Nay A Maung
*Assistant Examiner* — Dustin Bilodeau
(74) *Attorney, Agent, or Firm* — Robert R. Aragona

(57) ABSTRACT

An embodiment for detecting the danger of an object in close proximity of a subject is provided. The embodiment may include receiving real-time data from one or more IoT devices in a surrounding environment. The embodiment may also include detecting and classifying one or more subjects and one or more objects in an image from the one or more IoT devices. The embodiment may further include identifying one or more risk factors associated with each object. The embodiment may also include correlating the one or more risk factors associated with each object with the one or more subjects in the image. The embodiment may further include identifying relative positions of the one or more subjects and the one or more objects in the image. The embodiment may also include in response to determining a current position of at least one subject is dangerous, notifying a user of the danger.

17 Claims, 7 Drawing Sheets

(51) Int. Cl.
 G06V 20/40 (2022.01)
 G08B 21/02 (2006.01)
 G16Y 10/60 (2020.01)
(52) U.S. Cl.
 CPC .... G16Y 10/60 (2020.01); *G06T 2207/10016* (2013.01)
(58) Field of Classification Search
 CPC . G06T 7/70; G06T 2207/10016; G08B 21/02; G08B 21/0208; G08B 19/00; G16Y 10/60
 See application file for complete search history.

(56) References Cited

U.S. PATENT DOCUMENTS

| | | | |
|---|---|---|---|
| 10,964,202 | B2 | 3/2021 | Maeng |
| 11,587,422 | B1* | 2/2023 | Wang ................. G08B 21/0208 |
| 12,136,331 | B2 | 11/2024 | Patnaikuni et al. |
| 2013/0216094 | A1 | 8/2013 | Delean |
| 2018/0095482 | A1 | 4/2018 | Nelmes |
| 2019/0050691 | A1* | 2/2019 | Lee ................... G06F 18/24323 |
| 2024/0179404 | A1* | 5/2024 | Eirinberg .......... H04M 1/72454 |

OTHER PUBLICATIONS

AliExpress, "Children Accompany Home Anti Theft Guard Toy Smart Humanoid Robot Programmable Humaniod Robot", [Accessed on Mar. 17, 2022], 12 Pages, Retrieved from the Internet: https://www.aliexpress.com/i/32780092695.html.

CDC, "Accidents or Unintentional Injuries", Centers for Disease Control and Prevention, [Accessed from Internet Aug. 4, 2022], 2 Pages. Retrieved from Internet: https://www.cdc.gov/nchs/fastats/accidental-injury.htm.

Cheggou, et al., "An intelligent baby monitoring system based on Raspberry PI, IoT sensors and convolutional neural network", IEEE 21st International Conference on Information Reuse and Integration for Data Science, 2020, pp. 365-371, Downloaded from IEEE Xplore on Sep. 13, 2020. https://Ieeexplore.ieee.org/abstract/document/9191373.

Gomez-Gonzalez, et al., "Real Time Trajectory Prediction Using Deep Conditional Generative Models", ARXIV, Jan. 7, 2020, 8 Pages. https://arxiv.org/abs/1909.03895.

Grandview Research, "Baby Safety Products Market Size, Share & Trends Analysis Report by Product Type (Car Seats, Monitors), Distribution Channel (Offline, Online), by Region, and Segment Forecasts, 2019-2025", Grandviewresearch.com, [Accessed on Aug. 4, 2022], 12 Pages. Retrieved from the Internet: https://www.grandviewresearch.com/industry-analysis/baby-safety-products-market.

Li, et al., "Deep-Learning-Based Human Intention Prediction Using RGB Images and Optical Flow", Springer Nature B.V., Journal of Intelligent & Robotic Systems, Jun. 12, 2019, 13 Pages. https://doi.org/10.1007/s10846-019-01049-3.

Manns, et al., "Identifying human intention during assembly operations using wearable motion capturing systems including eye focus", Elsevier B.V., 54th CIRP Conference on Manufacturing Systems, ScienceDirect, 2021, 6 pages.

Mell et al., "The NIST Definition of Cloud Computing", Recommendations of the National Institute of Standards and Technology, NIST Special Publication 800-145, Sep. 2011, 7 pages.

Moon, et al., "Prediction of Human Trajectory Following a Haptic Robotic Guide Using Recurrent Neural Networks", ARXIV, 2019 IEEE World Haptics Conference (WHC), [Accessed on Aug. 1, 2022], 7 pages. Retrieved from the Internet: https://arxiv.org/abs/1903.01027.

SMProbotics, "Smart House Security Robot", smprobotics.com, [Accessed on Aug. 4, 2022], 8 pages. Retrieved from Internet https://smprobotics.com/products_autonomous_ugv/smart-house-security-robot/.

WHO, "World Report on Child Injury Prevention," World Health Organization, Margie Peden, et al (Eds.), (WHO, Switzerland, 2008), 232 pgs.

Esparza Tiffany. "Home Alone: the laws concerning leaving a child without supervision at home", Sheppard Air Force Base, Jun. 9, 2016, 2 pages.

IBM. "Cloud-Nanny", retrieved from web https://www.ibm.com/case-studies/cloudnanny, dated Apr. 21, 2025, 4 pages.

IBM. "IBM Products", retrieved from https://www.ibm.com/products, dated Apr. 21, 2025, 7 pages.

Poser Caroline B. "How IBM Cloud helps keep children safe and parents happy", retrieved from web https://web.archive.org/web/20221017061639/https://www.ibm.com/blogs/cloud-computing/2017/12/21/ibm-cloud-parents/, Dec. 21, 2017, 4 pages.

* cited by examiner

PROXIMITY DANGER DETECTION BASED ON SUBJECT AND OBJECT DISTANCE ANALYSIS

BACKGROUND

The present invention relates generally to the field of computing, and more particularly to a system for detecting the danger of an object in close proximity of a subject based on subject and object distance analysis.

Child monitoring systems, such as baby monitors and motion sensors, are currently used to supervise small children in both home and group environments. For example, the child monitoring systems may be deployed in a personal family residence and/or a daycare facility. These child monitoring systems have been most commonly used when a small child (e.g., an infant or toddler) is napping and/or sleeping through the night. This technology may also allow a parent or babysitter who is multi-tasking (e.g., caring for multiple small children simultaneously) to keep a watchful eye on numerous small children who are engaged in various activities. Accordingly, the demand for this technology is expected to increase in the coming years.

SUMMARY

According to one embodiment, a method, computer system, and computer program product for detecting the danger of an object in close proximity of a subject based on subject and object distance analysis is provided. The embodiment may include receiving real-time data from one or more IoT devices in a surrounding environment. The real-time data may include a video feed of one or more subjects engaged in one or more activities. The embodiment may also include detecting and classifying the one or more subjects and one or more objects in an image from the one or more IoT devices. The embodiment may further include identifying one or more risk factors associated with each object based on the classification of the one or more objects. The embodiment may also include correlating the one or more risk factors associated with each object with the one or more subjects in the image based on the one or more activities and the classification of the one or more subjects. The embodiment may further include identifying relative positions of the one or more subjects and the one or more objects in the image. The embodiment may also include in response to determining a current position of at least one subject is dangerous, notifying a user of the danger to the at least one subject.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
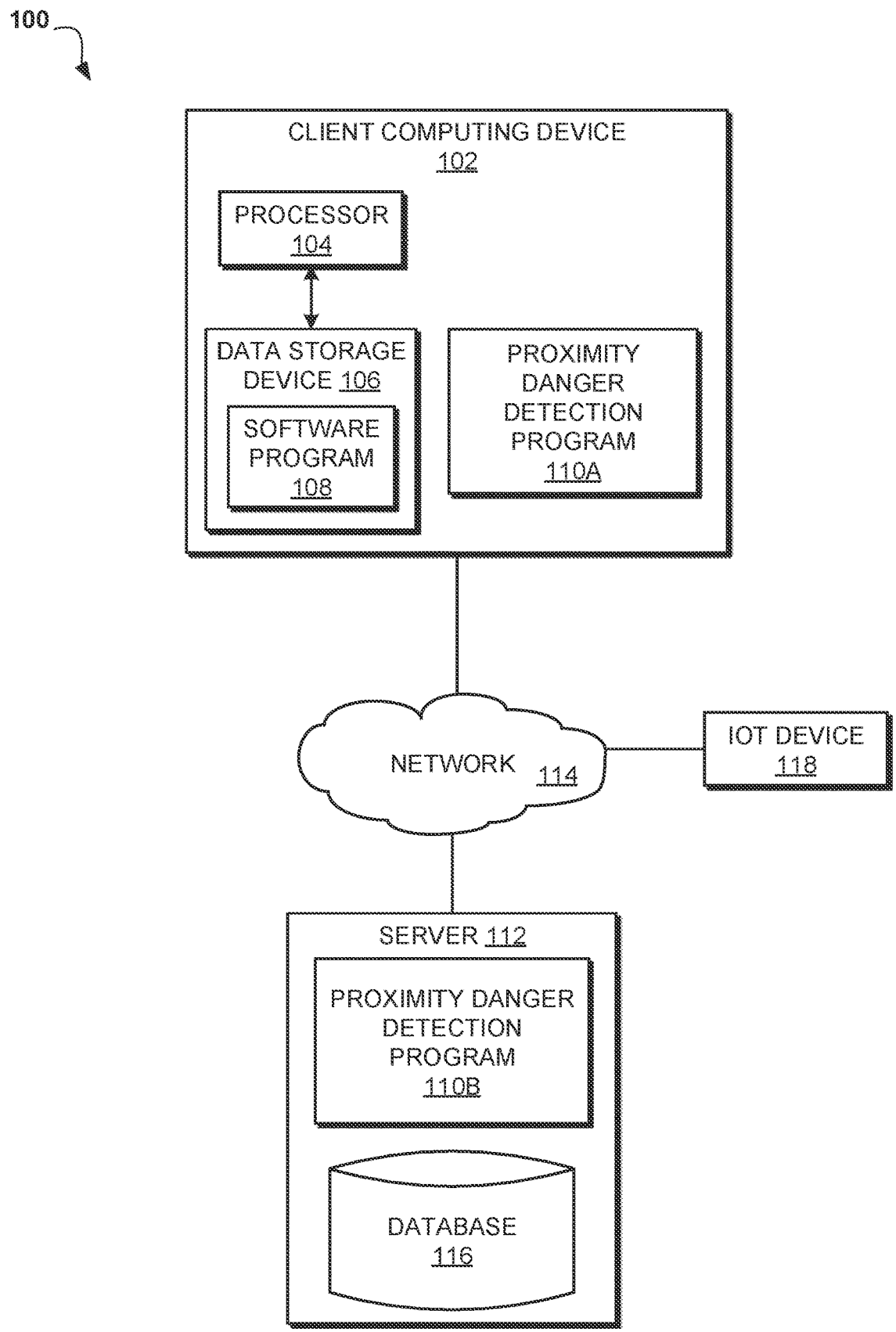
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for detecting the danger of an object in close proximity of a subject based on subject and object distance analysis. The following described exemplary embodiments provide a system, method, and program product to, among other things, identify relative positions of one or more subjects and one or more objects in an image and, accordingly, determine whether the current position of at least one subject is dangerous. Therefore, the present embodiment has the capacity to improve child safety monitoring device technology by proactively identifying the proximity danger of objects for different subjects.

As previously described, child monitoring systems, such as baby monitors and motion sensors, are currently used to supervise small children in both home and group environments. For example, the child monitoring systems may be deployed in a personal family residence and/or a daycare facility. These child monitoring systems have been most commonly used when a small child (e.g., an infant or toddler) is napping and/or sleeping through the night. This technology may also allow a parent or babysitter who is multi-tasking (e.g., caring for multiple small children simultaneously) to keep a watchful eye on numerous small children who are engaged in various activities. Accordingly, the demand for this technology is expected to increase in the coming years. It is difficult to determine at what point an object will become a danger for a subject under different circumstances. This problem is typically addressed by pre-defining dangers for various rooms in a surrounding environment. For example, the dangers of a small child entering a garage may be pre-defined. However, pre-defining dangers fails to identify the actual real-time risks the child may encounter when entering a particular area.

It may therefore be imperative to have a system in place to proactively identify the proximity danger of objects for different subjects. Thus, embodiments of the present invention may provide advantages including, but not limited to, enabling proximity danger detection based on subject and object distance analysis, enhancing the capabilities of child safety monitoring devices, and reducing the risk of injury to small children or pets. The present invention does not require that all advantages need to be incorporated into every embodiment of the invention.

According to at least one embodiment, when a subject (e.g., a small child or pet) engages in an activity, real-time data may be received from one or more IoT devices in a surrounding environment, where the real-time data may include a video feed of one or more subjects engaged in one or more activities. Upon receiving the real-time data, the one or more subjects and one or more objects may be detected and classified in an image from the one or more IoT devices in order to identify one or more risk factors associated with each object based on the classification of the one or more objects. Upon identifying the one or more risk factors, the one or more risk factors associated with each object may be correlated with the one or more subjects in the image based on the one or more activities and the classification of the one or more subjects. Then, relative positions of the one or more subjects and the one or more objects in the image may be identified in order to determine whether a current position of at least one subject is dangerous based on the relative positions of the one or more subjects and the one or more objects and the one or more correlated risk factors. According to at least one embodiment, in response to determining the current position of the at least one subject is dangerous, a notification of the danger to the at least one subject may be sent to a user. According to at least one other embodiment, in response to determining the current position of the at least one subject is not dangerous, the notification may not be sent to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify relative positions of one or more subjects and one or more objects in an image and, accordingly, determine whether the current position of at least one subject is dangerous.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a proximity danger detection program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a proximity danger detection program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a robotic device, a camera, a plurality of sensors (e.g., motion sensors, heat sensors, and sound sensors), and/or any device known in the art for detecting movements of people and objects that is capable of connecting to the communication network 114, and transmitting and receiving data with the client computing device 102 and the server 112.

According to the present embodiment, the proximity danger detection program 110A, 110B may be a program capable of receiving real-time data from one or more IoT Devices 118 in a surrounding environment, identifying relative positions of one or more subjects and one or more objects in an image, determining whether the current position of at least one subject is dangerous, enabling proximity danger detection based on subject and object distance analysis, enhancing the capabilities of child safety monitoring devices, and reducing the risk of injury to small children or pets. The proximity danger detection method is explained in further detail below with respect to FIGS. 2A and 2B.

Figure 2A:
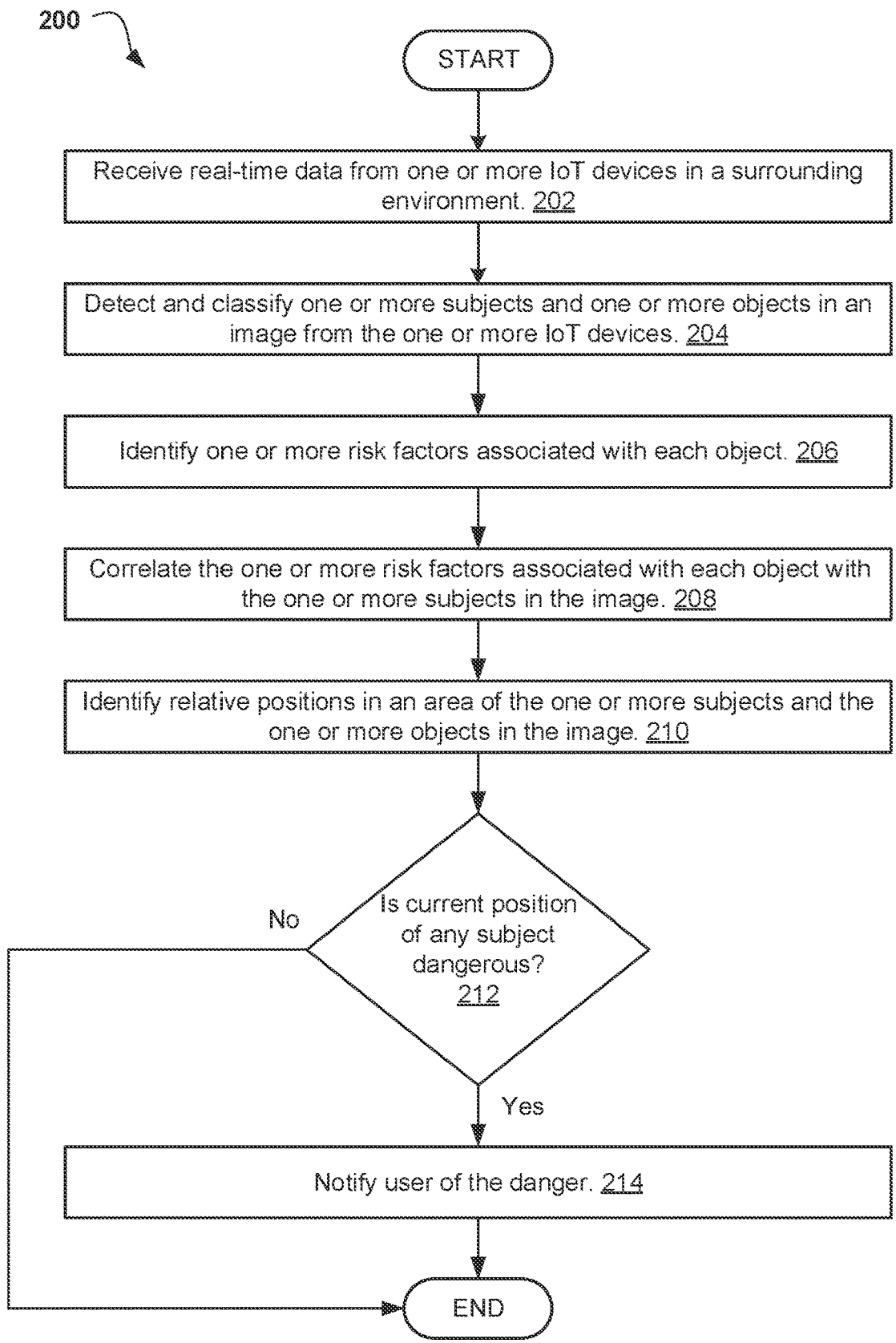
FIG. 2A illustrates an operational flowchart for detecting the danger of an object in close proximity of a subject based on subject and object distance analysis in a proximity danger detection process according to at least one embodiment.

Referring now to FIG. 2A, an operational flowchart for detecting the danger of an object in close proximity of a subject based on subject and object distance analysis in a proximity danger detection process 200 is depicted according to at least one embodiment. At 202, the proximity danger detection program 110A, 110B receives the real-time data from the one or more IoT Devices 118 in the surrounding environment. The real-time data at least includes the video feed of the one or more subjects engaged in the one or more activities. Examples of the IoT Device 118 may include, but are not limited to, the robotic device, the camera, the plurality of sensors (e.g., motion sensors, heat sensors, and sound sensors), and/or any device known in the art for detecting movements of people and objects. Examples of the activity may include, but are not limited to, eating, walking, crawling, running, and/or climbing. As used herein, the "subject" is a small child (e.g., infant or toddler) and/or a pet (e.g., dog or cat). The IoT Device 118 may capture sounds and video images in the surrounding environment, which may be received by the proximity danger detection program 110A, 110B. For example, the video feed may include images of the small child running around in a room. In another example, the audio may include a repetitive banging sound, which may indicate the small child is jumping.

According to at least one embodiment, receiving the real-time data may also include receiving a set of pre-defined configuration criteria from the user via a graphical user interface (GUI). The user may be an adult supervisor of the subject (e.g., a relative, babysitter, or daycare employee). The pre-defined configuration criteria may include an area ID for each IoT Device 118. For example, the one or more IoT Devices 118 may be installed in a bedroom, kitchen, playroom, garage, basement, living room, and/or any other room in a household or daycare facility. Continuing the example, the user may label the IoT Device 118 "Camera 1—Living Room." According to at least one other embodiment, the pre-defined configuration criteria may include one or more service preferences of the user. Examples of the service preference include, but are not limited to, types of incidents that require alerts (e.g., choking, falling object), types of monitoring required (e.g., video and/or audio monitoring), a type of area to be monitored (e.g., personal residence, daycare facility), and/or a type of protection required (e.g., text alert, vibration alert, deploy robotic device).

Then, at 204, the proximity danger detection program 110A, 110B detects and classifies the one or more subjects and the one or more objects in the image from the one or more IoT Devices 118. During a training phase, described in further detail below with respect to the description of FIG. 2B, the proximity danger detection program 110A, 110B may learn to recognize small children, pets, as well as various objects which may be a hazard in the surrounding environment. Based on historical learning of historical subjects and historical objects, also described in further detail below with respect to the description of FIG. 2B, the proximity danger detection program 110A, 110B may accurately detect and classify the one or more subjects and the one or more objects in real-time.

Upon detecting the one or more subjects (e.g., S1, S2, S3 . . . Sn) using image analysis and/or other computer vision techniques, the one or more subjects may be classified. Examples of the subject classification may include, but are not limited to, an infant (e.g., less than one year old), a toddler (e.g., more than one year old), a child (e.g., greater than three years old), and/or a pet. The one or more subjects may also be classified based on the one or more activities. For example, if the subject only craws and utters no words, the subject may be classified as an infant. Continuing the example, if the subject walks and utters random words, the subject may be classified as a toddler. In another example, if the subject walks and utters complete sentences, the subject may be classified as a child. It may be appreciated that the examples described above are not intended to be limiting, and that in embodiments of the present invention the subject may be classified in accordance with different criteria. Similarly, upon detecting the one or more objects (e.g., O1, O2, O3 . . . On) using image analysis and/or other computer vision techniques, the one or more objects may be classified. Examples of the object classification may include, but are not limited to, a knife, a bookshelf, an electrical outlet, a toy, a staircase, and/or any object commonly found in a household environment.

Next, at 206, the proximity danger detection program 110A, 110B identifies the one or more risk factors associated with each object. The one or more risk factors are identified based on the classification of the one or more objects described above with respect to step 204. For example, a risk factor associated with an electrical outlet may be electric shock. In another example, a risk factor associated with a small toy may be choking. In yet another example, a risk factor associated with a bookshelf may be the bookshelf falling on the subject. According to at least one embodiment, the one or more risk factors may be stored in an online repository, such at the database 116. For example, once the object is classified as a knife, the proximity danger detection program 110A, 110B may access the online repository for the risk factors associated with the knife (e.g., cuts and/or scrapes). According to at least one other embodiment, the one or more risk factors may be pre-defined by the user via the GUI. For example, the user may specify that a bookshelf in their home may have a risk of falling on a small child or pet.

The one or more risk factors may be ranked by a level of risk to each subject. These risk levels may include, but are not limited to, "low risk," "medium risk," or "high risk," described in further detail below with respect to step 208.

Then, at 208, the proximity danger detection program 110A, 110B correlates the one or more risk factors associated with each object with the one or more subjects in the image. The one or more risk factors are correlated based on the one or more activities and the classification of the one or more subjects. In this manner, the risk factors for one subject may be different than the risk factors for another subject. For example, when the object is a bookshelf, the risk of the bookshelf falling on a child (e.g., greater than three years old) may be "high risk," whereas the risk of the bookshelf falling on an infant (e.g., less than one year old) may be "low risk." This distinction may be made based on the fact that a child is stronger than an infant, and is therefore more capable of moving the bookshelf. In another example, when the object is a staircase, the risk of the child falling down the stairs may be "medium risk," whereas the risk of the infant falling down the stairs may be "high risk." This distinction may be made based on the fact that the infant doesn't have the stability that the child has.

As described above, the one or more risk factors are also correlated with the one or more subjects based on the one or more activities. For example, when the object is a knife on a countertop, and when a first subject is a toddler who is walking around and the second subject is also a toddler who is sitting stationary, the risk of the knife cutting the first subject may be "high risk," whereas the risk of the knife cutting the second subject may be "low risk." This distinction may be made based on the fact that the second subject who is sitting down may not be able to reach the knife since the knife is on the countertop. Thus, embodiments of the present invention dynamically determine when an object becomes a risk to a subject. It may be appreciated that the examples described above are not intended to be limiting, and that in embodiments of the present invention the level of risk to each subject may be different than in the examples.

Next, at 210, the proximity danger detection program 110A, 110B identifies the relative positions of the one or more subjects and the one or more objects in the image. The 3D image from the one or more IoT Devices 118 may be converted into a 2D floorplan of the particular room (e.g., a master bedroom).

According to at least one embodiment, the 2D floorplan may be constructed using audio from the particular room. Since sound is driven by the geometry of objects, the audio in the surrounding environment may provide spatial and semantic signals complementing the mapping capabilities of images. Audio reflections from sources in the particular room (e.g., child talking and/or dog barking) bounce off surfaces and may reveal the shape of the room. Furthermore, the sound may reveal what type the room is. For example, a microwave beep may suggest a kitchen. According to at least one other embodiment, the 2D floorplan may be obtained from the online repository. For example, the blueprints for a particular home or business address may be stored in the online repository. In either embodiment, the 2D floorplan may include quadrants separated by an intersection of an X-axis and a Y-axis. The relative position of a particular subject in the 2D floorplan may be defined as ($X_1$, $Y_1$) and the relative position of a particular object in the 2D floorplan may be defined as ($X_2$, $Y_2$). The relative positions of the one or more subjects and the one or more objects may then be used to calculate a current distance between each subject and each object in the physical room, described in further detail below with respect to step 212. During the training phase, described in further detail below with respect to the description of FIG. 2B, the proximity danger detection program 110A, 110B may learn, based on historical relative positions of historical subjects and historical objects, to accurately identify the relative positions of the one or more subjects and the one or more objects in real-time.

Then, at 212, the proximity danger detection program 110A, 110B determines whether the current position of the at least one subject is dangerous. The determination is based on the relative positions of the one or more subjects and the one or more objects and the one or more correlated risk factors. In particular, the relative positions of the one or more subjects and the one or more objects may be used to calculate the current distance between each subject and each object in the physical room. As described above with respect to step 210, the relative position of a particular subject in the 2D floorplan may be defined as ($X_1$, $Y_1$) and the relative position of a particular object in the 2D floorplan may be defined as ($X_2$, $Y_2$). Using the distance formula $d=\sqrt{(X2-X1)^2+(Y2-Y1)^2}$, where d is the distance, the current distance may be determined. For example, when ($X_1$, $Y_1$)=(2, 5) and ($X_2$, $Y_2$)=(8, −3), d=10, where 10 may be measured in feet, inches, or centimeters.

The distance may then be compared with a minimum risk distance calculated during the training phase and retained in the online repository, described in further detail below with respect to the description of FIG. 2B. The minimum risk distance may be a safe distance where the risk of injury to the subject is minimal. For example, where the object is a bookshelf, the minimum risk distance may be a distance between the subject and the bookshelf where if the bookshelf falls, the subject may not be injured. When the current distance between the subject and the object is less than the minimum risk distance, the current position of the subject may be deemed a dangerous position. Continuing the example above where the current distance is 10 feet, when the minimum risk distance between the subject and the bookshelf is 12 feet, the current position of the subject may be deemed a dangerous position. In another example, where the current distance is also 10 feet, and when the minimum risk distance between the subject and the bookshelf is 8 feet, the current position of the subject may not be deemed a dangerous position.

According to at least one embodiment, the determination may be made when the correlated risk factor between the object and the subject is "medium risk" or "high risk," and the determination may not be made when the correlated risk factor between the object and the subject is "low risk." For example, when the subject is an infant and the object is the bookshelf, the correlated risk factor of the bookshelf falling on the infant may be "low risk" since the infant does not have the physical capacity to move the bookshelf. In this example, there may be no need to calculate the current distance between the infant and the bookshelf.

In response to determining the current position of the at least one subject is dangerous (step 212, "Yes" branch), the proximity danger detection process 200 proceeds to step 214 to notify the user of the danger to the at least one subject. In response to determining the current position of the at least one subject is not dangerous (step 212, "No" branch), the proximity danger detection process 200 ends.

Next, at 214, the proximity danger detection program 110A, 110B notifies the user of the danger to the at least one subject. When the correlated risk factor between the object and the subject is "medium risk" or "high risk" and when the current distance between the subject and the object is less than the minimum risk distance, the notification may be sent to the user. The notification may be sent in accordance with the pre-defined configuration criteria set by the user as described above with respect to step 202. For example, when the user sets electrical shock and falling objects as the types of incidents that require alerts, the user may only receive the notification when the subject is in danger of being shocked by the electrical outlet or when the subject is in danger of the object falling on them. Continuing the example, when the user sets the type of alert for electrical shock to text notifications and the type of alert for falling objects to a vibration alert, the user may receive the text notification when the subject is in danger of electric shock and the vibration alert when the subject is in danger of an object falling on them.

According to at least one embodiment, the notification may include the area ID where the current position of the at least one subject is dangerous. For example, notification may state, "Subject 1 is in danger of electrical shock in the master bedroom." According to at least one other embodiment, sending the notification to the user may include sending a simultaneous notification to a robotic device to perform a preventive action. The preventive action performed by the robotic device may be removing the one or more objects that pose a danger to the subject and/or blocking the at least one subject whose current position is dangerous from reaching the one or more objects. For example, the simultaneous notification sent to the robotic device may prompt the robotic device to remove a knife on a table and/or block the subject from reaching an electrical outlet or staircase. It may be appreciated that the examples described above are not intended to be limiting, and that in embodiments of the present invention the user may receive different types of notifications based on the pre-defined configuration criteria.

Figure 2B:
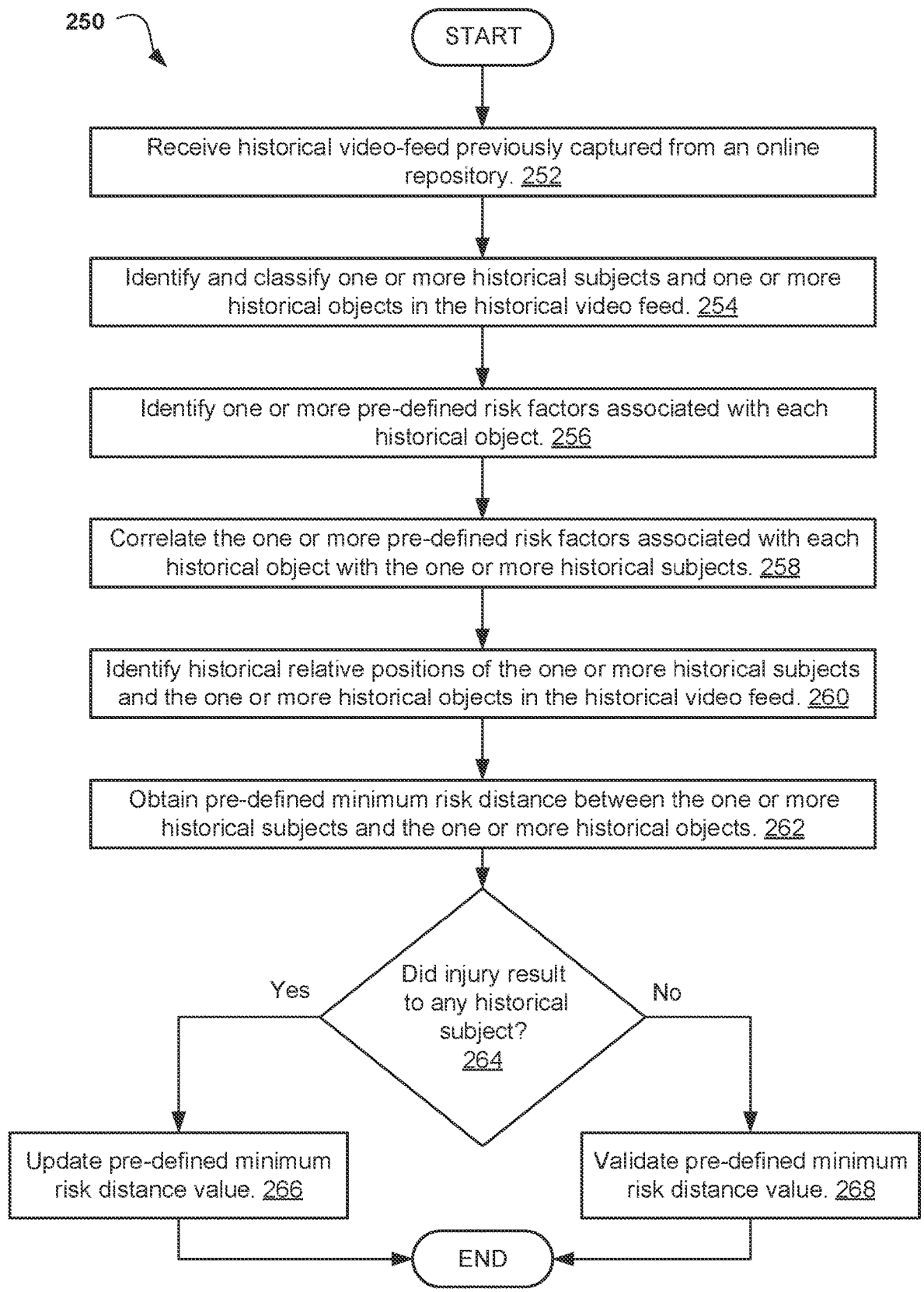
FIG. 2B illustrates an operational flowchart of a training phase in the proximity danger detection process of FIG. 2A according to at least one embodiment.

Referring now to FIG. 2B, an operational flowchart of a training phase 250 in the proximity danger detection process 200 of FIG. 2A is depicted according to at least one embodiment. The training phase 250 may be a supervised learning model to improve the accuracy of the proximity danger detection program 110A, 110B when deployed in the real-time environment. At 252, the proximity danger detection program 110A, 110B receives the historical video feed that was previously captured from the online repository. The online repository may include historical video data where an injury may or may not have resulted to at least one historical subject. As used herein, the qualifier "historical" is used to distinguish between the training phase 250 and the real-time implementation of the proximity danger detection process 200 described above with respect to the description of FIG. 2A. The historical video feed may include images of one or more historical subjects engaged in one or more historical activities. For example, the historical video feed may include images of the historical subject running around in a room.

Then, at 254, the proximity danger detection program 110A, 110B identifies and classifies the one or more historical subjects and one or more historical objects in the historical video feed. The proximity danger detection program 110A, 110B may learn to recognize small children, pets, as well as various objects which may be a hazard in the surrounding environment.

Upon identifying the one or more historical subjects (e.g., HS1, HS2, HS3 . . . HSn) using image analysis and/or other computer vision techniques, the one or more historical subjects may be classified (e.g., infant, toddler, child, or pet). Similarly, upon identifying the one or more historical objects (e.g., HO1, HO2, HO3 . . . HOn) using image analysis and/or other computer vision techniques, the one or more historical objects may be classified (e.g., knife, bookshelf, or electrical outlet). The classification of the one or more historical subjects and the one or more historical objects may enable the accurate classification of the one or more subjects and the one or more objects of similar height and width during the real-time implementation.

Next, at 256, the proximity danger detection program 110A, 110B identifies one or more pre-defined risk factors associated with each historical object from the online repository. The one or more risk factors may be pre-defined by a software developer or administrator via the GUI. For example, the developer may specify that a bookshelf may have a risk of falling on a small child or pet.

Then, at 258, the proximity danger detection program 110A, 110B correlates the one or more pre-defined risk factors associated with each historical object with the one or more historical subjects based on the one or more historical activities and the classification of the one or more historical subjects. The correlation may be made as described above with respect to step 208 of FIG. 2A. The correlation between the one or more pre-defined risk factors and the one or more historical subjects may enable the accurate correlation between the one or more risk factors and the one or more subjects during the real-time implementation.

Next, at 260, the proximity danger detection program 110A, 110B identifies historical relative positions of the one or more historical subjects and the one or more historical objects in the historical video feed. The identification of the historical relative positions may be made as described above with respect to step 210 of FIG. 2A. The historical relative positions may then be used to calculate a current distance between each historical subject and each historical object in the physical room, also as described above with respect to step 210 of FIG. 2A. The identification of the historical relative positions may enable the accurate identification of the relative positions of the one or more subjects and the one or more objects during the real-time implementation.

Then, at 262, the proximity danger detection program 110A, 110B obtains a pre-defined minimum risk distance between the one or more historical subjects and the one or more historical objects from the online repository. The pre-defined minimum risk distance may be defined by the software developer or administrator via the GUI. For example, the developer may specify that for a bookshelf 10 feet high, the minimum risk distance may be 15 feet away from the bookshelf.

Next, at 264, the proximity danger detection program 110A, 110B determines whether an injury resulted to at least one historical subject. According to at least one embodiment, during supervised learning, the software developer or administrator may directly specify that an injury resulted to at least one historical subject. According to at least one other embodiment, the determination may be made using image analysis, computer vision techniques, and/or sounds from the one or more historical subjects.

In response to determining the injury resulted to the at least one historical subject (step 264, "Yes" branch), the training phase 250 proceeds to step 266 to update the pre-defined minimum risk distance in the online repository for the at least one historical subject. In response to determining the injury did not result to the at least one historical subject (step 264, "No" branch), the training phase 250 proceeds to step 268 to validate the pre-defined minimum risk distance for the at least one historical subject.

Then, at 266, the proximity danger detection program 110A, 110B updates the pre-defined minimum risk distance in the online repository for the at least one historical subject. The online repository may include a table that includes the pre-defined minimum risk distance for each historical subject. In the table, for each historical object, a historical subject is paired with the historical object. This pairing may include the pre-defined minimum risk distance between a particular historical object and a particular historical subject. In embodiments where the injury results to the at least one historical subject, the pre-defined minimum risk distance may be updated in the table for the at least one historical subject who was injured. This updated value may be used during the real-time implementation to determine whether the current position of the at least one subject is dangerous.

Next, at 268, the proximity danger detection program 110A, 110B validates the pre-defined minimum risk distance. The pre-defined minimum risk distance may be validated by tagging the pre-defined minimum risk distance with metadata in the online repository indicating the pre-defined minimum risk distance is a safe distance.

Figure 3:
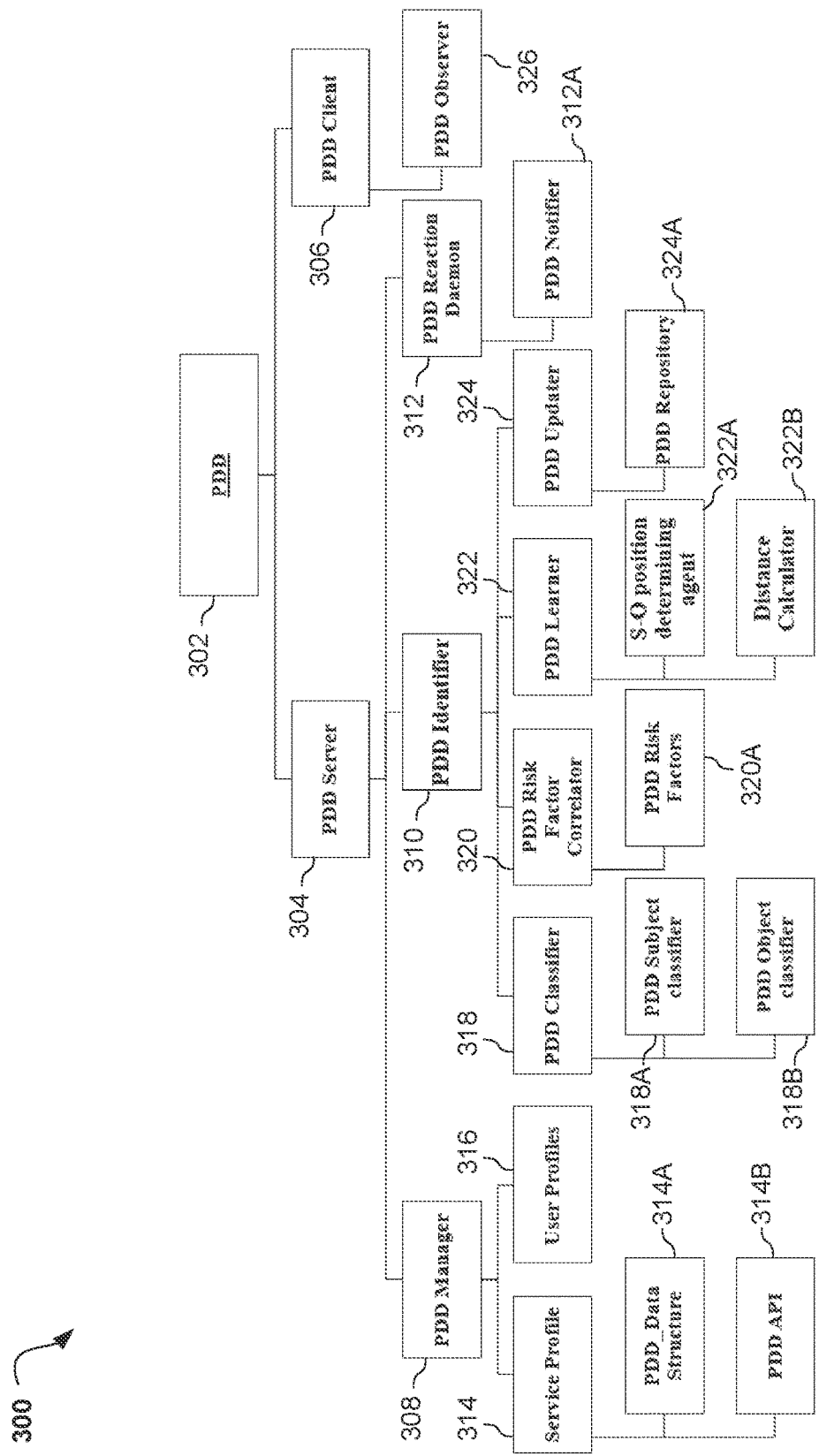
FIG. 3 is a diagram depicting an interaction between solution components of the processes in FIGS. 2A and 2B according to at least one embodiment.

Referring now to FIG. 3, a diagram 300 depicting an interaction between solution components of the processes in FIGS. 2A and 2B is shown according to at least one embodiment. In the diagram 300, a proximity danger detection (PDD) system 302 may include a PDD server 304 and a PDD client 306. The PDD server 304 may, according to at least one embodiment, provide the real-time service described above with respect to the description of FIG. 2A. The PDD server 304 may include a PDD manager module 308, a PDD identifier module 310, and a PDD reaction daemon 312. The PDD manager module 308 may include a GUI for a developer, administrator, or user to create and update service preferences. These service preferences may be stored in a service profile 314, which may be a file for storing types of incidents that require alerts, types of monitoring required, and/or a type of protection required (e.g., text alert, vibration alert, deploy robotic device). The service profile 314 may also define a PDD data structure 314A for saving and tracking a subject and object activity context. The service profile 314 may further define a PDD API 314B through which various applications may communicate with the proximity danger detection program 110A, 110B. The PDD manager module 308 may include user profiles 316, which may be a file to store a type of area to be monitored (e.g., personal residence, daycare facility). A PDD classifier module 318 may classify subjects and objects utilizing a PDD subject classifier module 318A and a PDD object classifier module 318B, respectively. A PDD risk factor correlator module 320 may correlate the one or more risk factors with the one or more subjects and may include a PDD risk factors module 320A for associating risks with objects (e.g., electric outlet—electrical shock). A PDD learner module 322 may recognize subject actions based on learned historical actions and may include a subject-object (S-O) position determining agent 322A to identify the relative positions of the one or more historical subjects and the one or more historical objects in the image. The PDD learner module 322 may also include a distance calculator module 322B to calculate a current distance between the subject and the object during the real-time implementation and calculate a minimum risk distance between the historical subject and the historical object during training. A PDD updater module 324 may update the minimum risk distance during both the real-time implementation and during training, where the updated minimum risk distance is stored in a PDD repository 324A. The PDD reaction daemon 312 may include a PDD notifier module 312A to notify the user of the danger to the at least one subject. The PDD client 306 may include a PDD observer module 326 to observe subjects and objects using the IoT Device 118.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
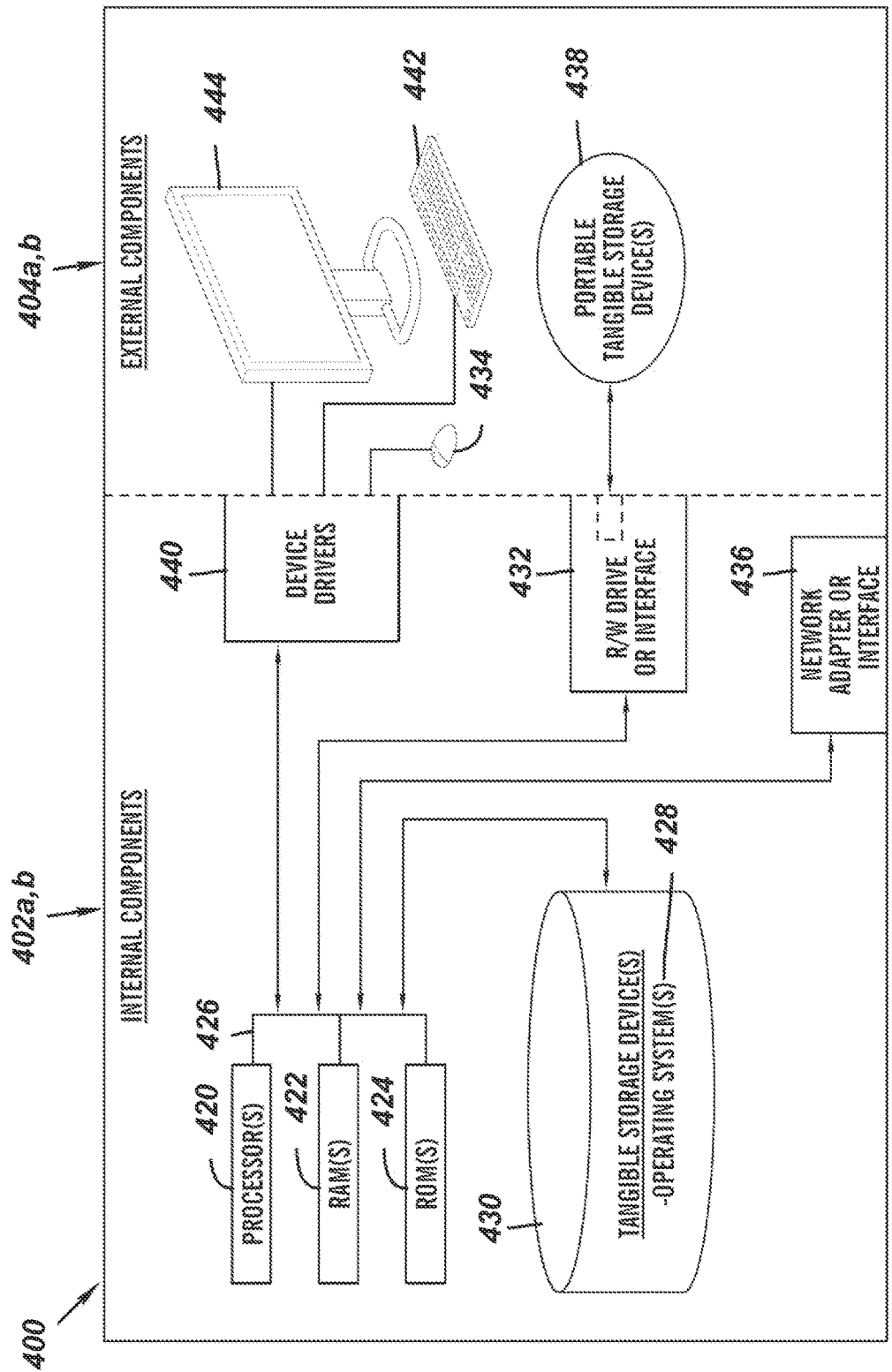
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the proximity danger detection program 110A in the client computing device 102 and the proximity danger detection program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the proximity danger detection program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the proximity danger detection program 110A in the client computing device 102 and the proximity danger detection program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the proximity danger detection program 110A in the client computing device 102 and the proximity danger detection program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
On-demand self-service: a cloud consumer can unilaterally provision computing capabilities, such as server time and network storage, as needed automatically without requiring human interaction with the service's provider.
Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
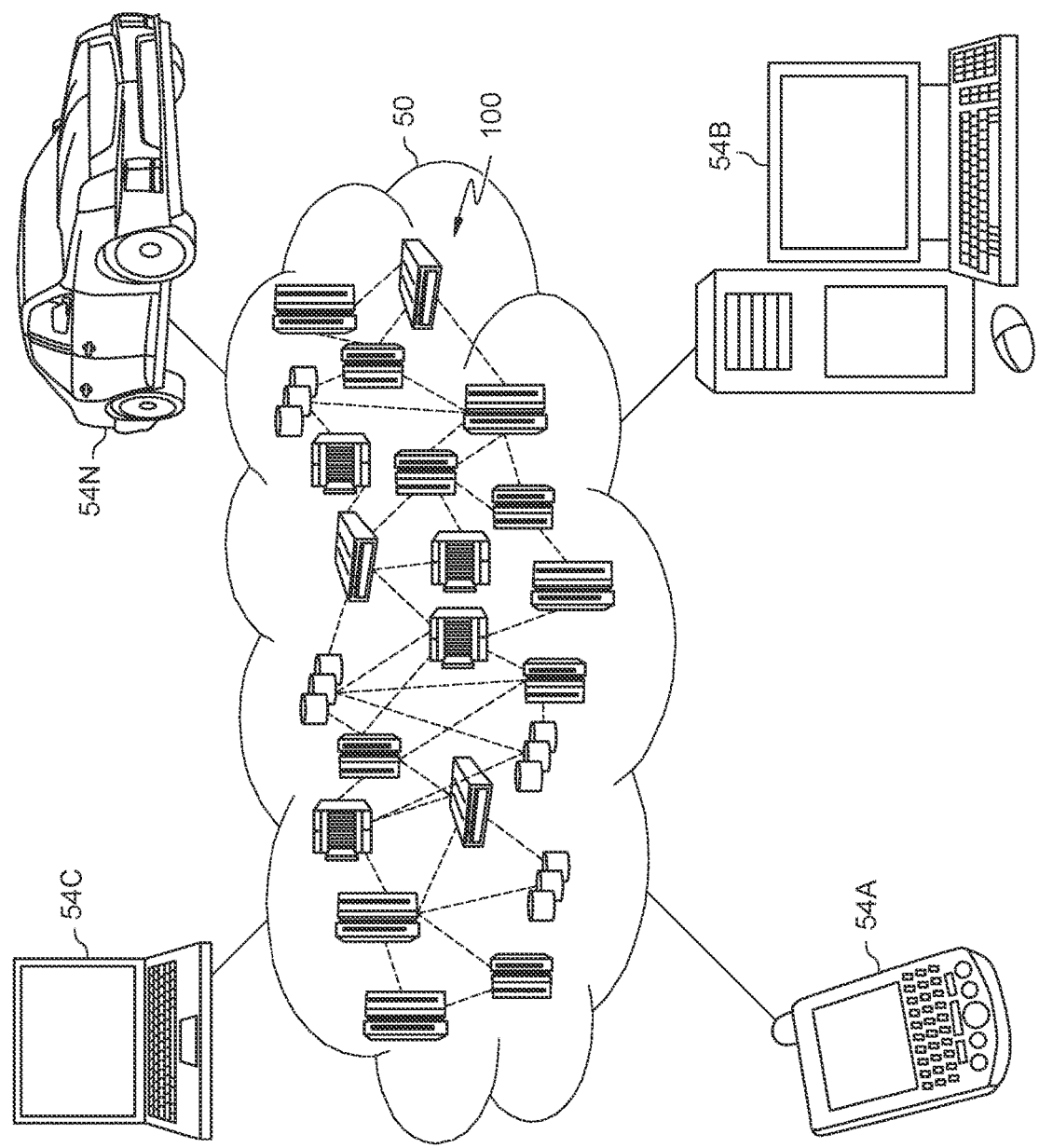
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
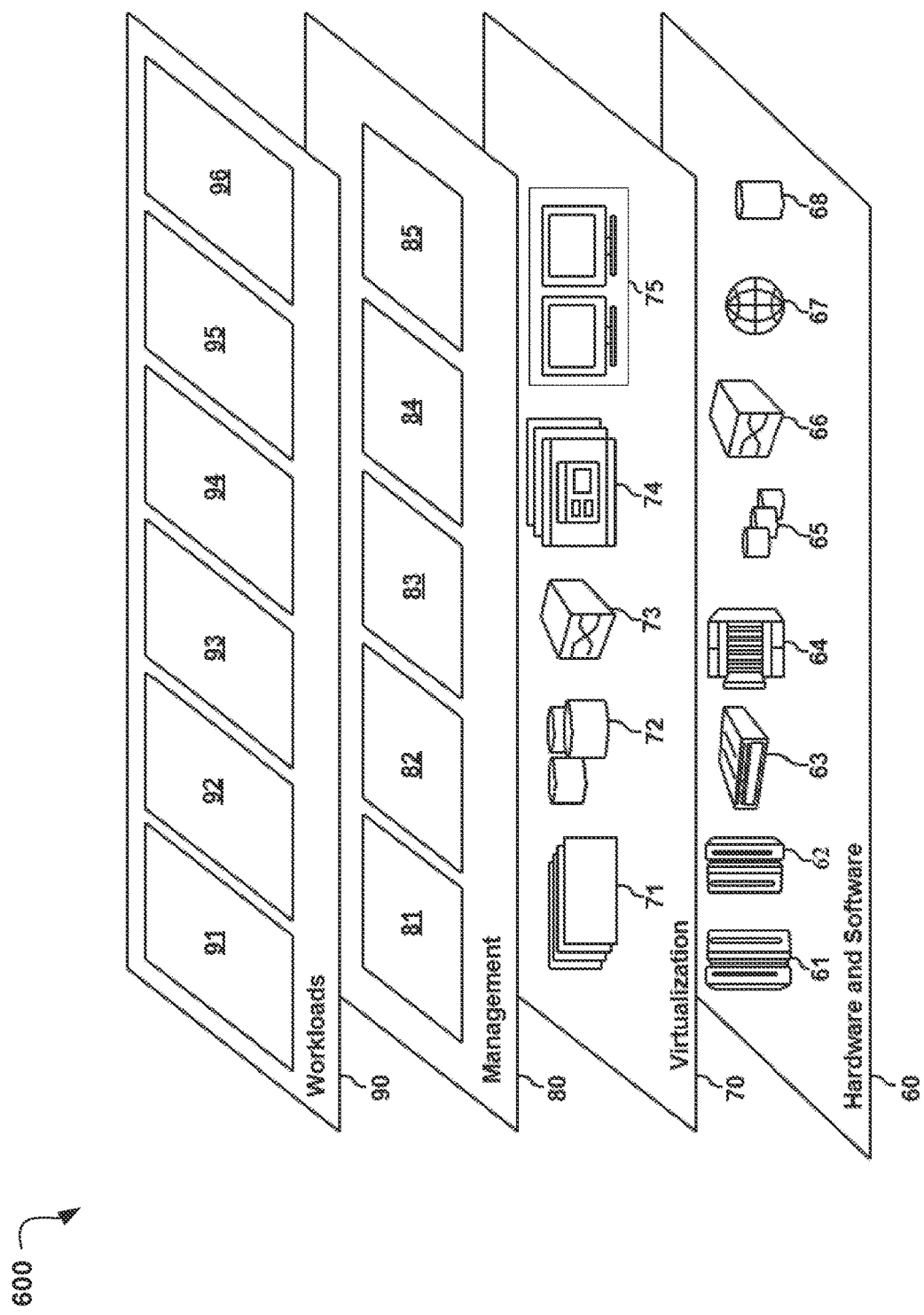
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting the danger of an object in close proximity of a subject based on subject and object distance analysis 96. Detecting the danger of an object in close proximity of a subject based on subject and object distance analysis 96 may relate to identifying relative positions of one or more subjects and one or more objects in an image in order to determine whether the current position of at least one subject is dangerous.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of detecting the danger of an object in close proximity of a subject, the method comprising:
   receiving real-time data from one or more IoT devices in a surrounding environment, wherein the real-time data includes a video feed of one or more subjects engaged in one or more activities;
   detecting and classifying the one or more subjects and one or more objects in an image from the one or more IoT devices;
   identifying one or more risk factors associated with each object based on the classification of the one or more objects;
   correlating the one or more risk factors associated with each object with the one or more subjects in the image based on the one or more activities and the classification of the one or more subjects, wherein correlating the one or more risk factors includes correlating a first risk factor of the one or more risk factors with a first subject of the one or more subjects and correlating a different risk factor of the one or more risk factors with a different subject of the one or more subjects based on one or more characteristics associated with the first subject and the different subject;
   identifying relative positions of the one or more subjects and the one or more objects in the image;
   determining whether a current position of at least one subject is dangerous based on the relative positions of the one or more subjects and the one or more objects and the one or more correlated risk factors; and
   in response to determining the current position of the at least one subject is dangerous based on a current distance between the at least one subject and at least one object of the one or more objects being less than a minimum risk distance, notifying a user of the danger to the at least one subject, wherein notifying the user of the danger to the at least one subject further comprises:
   sending a simultaneous notification to a robotic device to perform a preventive action, wherein the simultaneous notification causes the robotic device to at least remove the at least one object to a location where a distance between the at least one subject and the at least one object is greater than the minimum risk distance.

2. The computer-based method of claim 1, further comprising a training phase, wherein the training phase comprises:
   receiving a historical video feed previously captured from an online repository;
   identifying and classifying one or more historical subjects and one or more historical objects in the historical video feed;
   identifying one or more pre-defined risk factors associated with each historical object from the online repository;
   correlating the one or more pre-defined risk factors associated with each historical object with the one or more historical subjects based on the one or more historical activities and the classification of the one or more historical subjects;
   identifying historical relative positions of the one or more historical subjects and the one or more historical objects in the historical video feed;
   obtaining a pre-defined minimum risk distance between the one or more historical subjects and the one or more historical objects from the online repository;
   determining whether an injury resulted to at least one historical subject; and
   in response to determining the injury resulted to the at least one historical subject, updating the pre-defined minimum risk distance in the online repository for the at least one historical subject.

3. The computer-based method of claim 2, wherein the online repository contains a table including the pre-defined minimum risk distance for each historical subject, and wherein the pre-defined minimum risk distance is updated in the table for the at least one historical subject who was injured.

4. The computer-based method of claim 1, wherein receiving the real-time data further comprises:
   receiving pre-defined configuration criteria from the user, wherein the pre-defined configuration criteria includes an area ID for each IOT device and one or more service preferences.

5. The computer-based method of claim 4, wherein the notification includes the area ID where the current position of the at least one subject is dangerous.

6. The computer-based method of claim 1, wherein the preventive action further includes blocking the at least one subject from reaching the one or more objects.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving real-time data from one or more IoT devices in a surrounding environment, wherein the real-time data includes a video feed of one or more subjects engaged in one or more activities;

detecting and classifying the one or more subjects and one or more objects in an image from the one or more IoT devices;

identifying one or more risk factors associated with each object based on the classification of the one or more objects;

correlating the one or more risk factors associated with each object with the one or more subjects in the image based on the one or more activities and the classification of the one or more subjects, wherein correlating the one or more risk factors includes correlating a first risk factor of the one or more risk factors with a first subject of the one or more subjects and correlating a different risk factor of the one or more risk factors with a different subject of the one or more subjects based on one or more characteristics associated with the first subject and the different subject;

identifying relative positions of the one or more subjects and the one or more objects in the image;

determining whether a current position of at least one subject is dangerous based on the relative positions of the one or more subjects and the one or more objects and the one or more correlated risk factors; and in response to determining the current position of the at least one subject is dangerous based on a current distance between the at least one subject and at least one object of the one or more objects being less than a minimum risk distance, notifying a user of the danger to the at least one subject, wherein notifying the user of the danger to the at least one subject further comprises:

sending a simultaneous notification to a robotic device to perform a preventive action, wherein the simultaneous notification causes the robotic device to at least remove the at least one object to a location where a distance between the at least one subject and the at least one object is greater than the minimum risk distance.

8. The computer system of claim 7, further comprising a training phase, wherein the training phase comprises:

receiving a historical video feed previously captured from an online repository;

identifying and classifying one or more historical subjects and one or more historical objects in the historical video feed;

identifying one or more pre-defined risk factors associated with each historical object from the online repository;

correlating the one or more pre-defined risk factors associated with each historical object with the one or more historical subjects based on the one or more historical activities and the classification of the one or more historical subjects;

identifying historical relative positions of the one or more historical subjects and the one or more historical objects in the historical video feed;

obtaining a pre-defined minimum risk distance between the one or more historical subjects and the one or more historical objects from the online repository;

determining whether an injury resulted to at least one historical subject; and in response to determining the injury resulted to the at least one historical subject, updating the pre-defined minimum risk distance in the online repository for the at least one historical subject.

9. The computer system of claim 8, wherein the online repository contains a table including the pre-defined minimum risk distance for each historical subject, and wherein the pre-defined minimum risk distance is updated in the table for the at least one historical subject who was injured.

10. The computer system of claim 7, wherein receiving the real-time data further comprises:

receiving pre-defined configuration criteria from the user, wherein the pre-defined configuration criteria includes an area ID for each IOT device and one or more service preferences.

11. The computer system of claim 10, wherein the notification includes the area ID where the current position of the at least one subject is dangerous.

12. The computer system of claim 7, wherein the preventive action further includes blocking the at least one subject from reaching the one or more objects.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving real-time data from one or more IoT devices in a surrounding environment, wherein the real-time data includes a video feed of one or more subjects engaged in one or more activities;

detecting and classifying the one or more subjects and one or more objects in an image from the one or more IoT devices;

identifying one or more risk factors associated with each object based on the classification of the one or more objects;

correlating the one or more risk factors associated with each object with the one or more subjects in the image based on the one or more activities and the classification of the one or more subjects, wherein correlating the one or more risk factors includes correlating a first risk factor of the one or more risk factors with a first subject of the one or more subjects and correlating a different risk factor of the one or more risk factors with a different subject of the one or more subjects based on one or more characteristics associated with the first subject and the different subject;

identifying relative positions of the one or more subjects and the one or more objects in the image;

determining whether a current position of at least one subject is dangerous based on the relative positions of the one or more subjects and the one or more objects and the one or more correlated risk factors; and in response to determining the current position of the at least one subject is dangerous based on a current distance between the at least one subject and at least one object of the one or more objects being less than a minimum risk distance, notifying a user of the danger to the at least one subject, wherein notifying the user of the danger to the at least one subject further comprises:

sending a simultaneous notification to a robotic device to perform a preventive action, wherein the simultaneous notification causes the robotic device to at least remove the at least one object to a location where a distance between the at least one subject and the at least one object is greater than the minimum risk distance.

14. The computer program product of claim 13, further comprising a training phase, wherein the training phase comprises:
- receiving a historical video feed previously captured from an online repository;
- identifying and classifying one or more historical subjects and one or more historical objects in the historical video feed;
- identifying one or more pre-defined risk factors associated with each historical object from the online repository;
- correlating the one or more pre-defined risk factors associated with each historical object with the one or more historical subjects based on the one or more historical activities and the classification of the one or more historical subjects;
- identifying historical relative positions of the one or more historical subjects and the one or more historical objects in the historical video feed;
- obtaining a pre-defined minimum risk distance between the one or more historical subjects and the one or more historical objects from the online repository;
- determining whether an injury resulted to at least one historical subject; and
- in response to determining the injury resulted to the at least one historical subject, updating the pre-defined minimum risk distance in the online repository for the at least one historical subject.

15. The computer program product of claim 14, wherein the online repository contains a table including the pre-defined minimum risk distance for each historical subject, and wherein the pre-defined minimum risk distance is updated in the table for the at least one historical subject who was injured.

16. The computer program product of claim 13, wherein receiving the real-time data further comprises:
- receiving pre-defined configuration criteria from the user, wherein the pre-defined configuration criteria includes an area ID for each IOT device and one or more service preferences.

17. The computer program product of claim 16, wherein the notification includes the area ID where the current position of the at least one subject is dangerous.

* * * * *